United States Patent [19]
Goodbred

[11] Patent Number: 5,741,000
[45] Date of Patent: Apr. 21, 1998

[54] VEHICLE SEAT TRACK ASSEMBLY

[75] Inventor: Neil G. Goodbred, Royal Oak, Mich.

[73] Assignee: Atoma International, Inc., Ontario, Canada

[21] Appl. No.: 527,727

[22] Filed: Sep. 13, 1995

[51] Int. Cl.[6] ................................ F16M 13/00
[52] U.S. Cl. .................. 248/430; 248/429; 248/424; 296/65.1
[58] Field of Search .................. 248/429, 430, 248/424; 296/65.1

[56] References Cited

U.S. PATENT DOCUMENTS

| 4,487,459 | 12/1984 | Rees . | |
|---|---|---|---|
| 4,556,186 | 12/1985 | Langmesser, Jr. et al. . | |
| 4,863,289 | 9/1989 | Lecerf . | |
| 4,909,469 | 3/1990 | Nihei et al. | 248/429 |
| 4,950,088 | 8/1990 | Pipon et al. . | |
| 5,188,329 | 2/1993 | Takahara | 248/430 |
| 5,407,166 | 4/1995 | Pilarski | 248/430 |
| 5,447,352 | 9/1995 | Ito et al. | 296/65.1 |

FOREIGN PATENT DOCUMENTS

| 490313A2 | 9/1991 | European Pat. Off. . | |
|---|---|---|---|
| 484024A1 | 10/1991 | European Pat. Off. . | |
| 0 490 313 A2 | 6/1992 | European Pat. Off. . | |
| 0 543 317 A1 | 5/1993 | European Pat. Off. . | |
| 2286723 | 4/1976 | France . | |
| 2449549 | 9/1980 | France . | |
| 2606339 | 11/1986 | France . | |
| 4304107A1 | 2/1993 | Germany . | |
| 62-85738 | 4/1987 | Japan | 278/424 |
| 6270727 | 9/1994 | Japan | 248/429 |
| 2188543 | 10/1987 | United Kingdom | 248/429 |
| 2256131 | 2/1992 | United Kingdom | 296/65.1 |

Primary Examiner—Leslie A. Braun
Assistant Examiner—Charles J. Hunter
Attorney, Agent, or Firm—Cushman Darby & Cushman Intellectual Property Group of Pillsbury Madison & Sutro LLP

[57] ABSTRACT

A vehicle seat track assembly wherein guide elements are mounted on one of a pair of cooperating track structures. The guide elements have generally vertically facing guide surfaces which have been broached to be positioned a predetermined distance vertically from generally opposed spaced surfaces on the one track structure. The vertically facing guide surfaces slidably engage generally oppositely facing surfaces of another of the track structures so as to effectively prevent relative vertical movement in a direction tending to vertically separate the track structures. When used in a manually actuated mode, the track assembly includes a locking assembly comprising a pair of abutting metal plates stamped to provide abutting elongated mounting portions having a plurality of spaced abutting locking portions extending transversely therefrom, a mounting structure within which the mounting portions of the abutting plates extend and a spring constructed and arranged to resiliently bias the mounting structure and abutting plates into a locking position wherein the locking portions are within selected notches and to enable the mounting structure and abutting plates to be manually moved against the resilient bias into a releasing position wherein the locking portions are out of the notches.

26 Claims, 5 Drawing Sheets

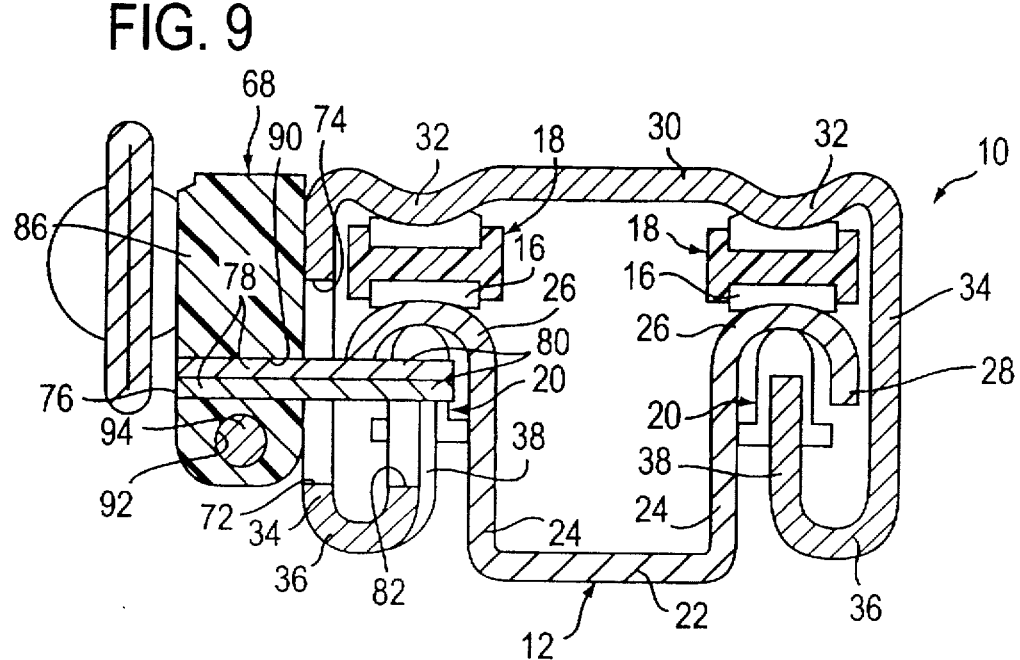
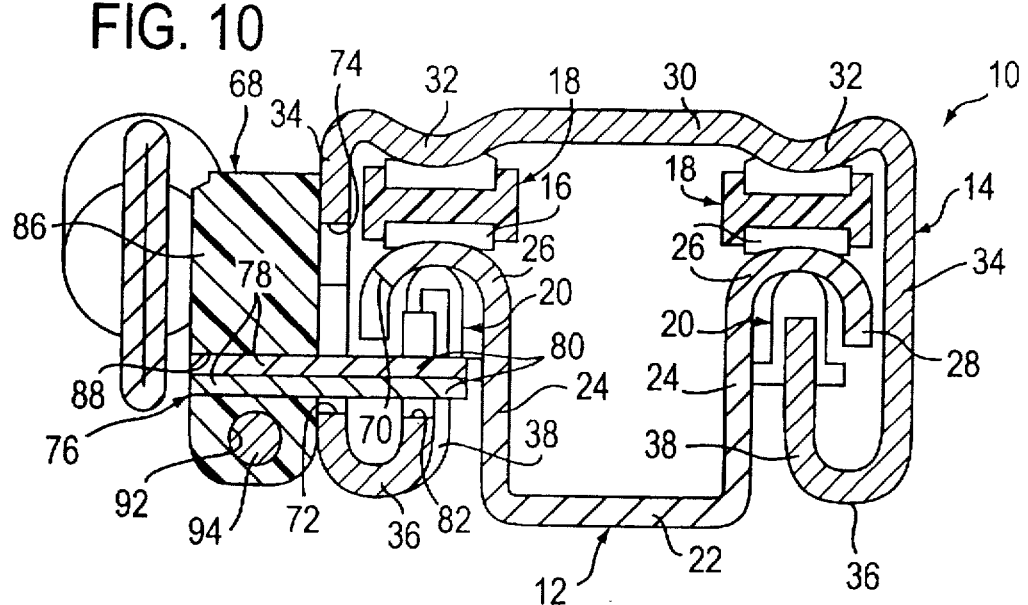

VEHICLE SEAT TRACK ASSEMBLY

This invention relates to vehicle seat track assemblies and more particularly to improvements in the guiding elements and locking assemblies embodied in vehicle seat track assemblies.

Seat track assemblies are conventional equipment in adjustable vehicle seats. Usually, there are two seat track assemblies utilized to adjustably support a single vehicle seat. Each seat track assembly comprises basically a pair of track structures, a set of rolling elements and a set of guide elements. The rolling elements are utilized to rollingly support a movable one of the track structures on a fixed one of the track structures. The fixed track structure is fixed to the vehicle floor and the movable track structure supports a portion of the vehicle seat. The rolling support provided by the rolling elements enables the movable track structure with the seat attached to be moved fore and aft into a multiplicity of adjusted positions. The guide elements are provided to prevent relative vertical movement between the track structures in a direction tending to separate them vertically.

The adjustment can be effected either by power actuation or manually. The power actuating mechanism utilized usually functions to retain the seat in any position of adjustment into which it has moved the seat. Manual actuation contemplates manual movement into the desired position of adjustment and hence a locking mechanism must be provided to retain the seat in the position into which it has been manually moved. Conversely, the locking mechanism must be capable of being manually released from its locking condition in order for manual movement to take place.

The guide elements of a basic vehicle track assembly perform an essential function in stabilizing the adjustable seat. The driver's seat must essentially always be adjustable so as to accommodate different sized drivers to the vehicle controls. While it is true that the driver's seat will be loaded with weight (the driver) during operation, the situation is dynamic with bumps and other conditions causing loads to instantaneously vary and even reverse in which case the guide elements provide stability. Moreover, guide elements keep non-occupied adjustable seats stable and prevent annoying rattles from taking place.

To perform this function efficiently, the guide elements should be engaged between the track structures when they are in rolling contact with the rolling elements. A problem in achieving this desirable condition is the tolerances which exist between the rolling surfaces of the track structures and the rolling elements as well as the guide surfaces of the track structures and the guide elements themselves. It has been proposed in European Patent Publication No. 0490313 to construct the guide elements so that they have a certain amount of give or elasticity. However, it is a difficult problem to provide just the right amount of elasticity which will effectively accommodate both the greatest amount of tolerance and the least amount. A need exists to provide a vehicle track assembly in which the guide elements perform in a more cost effective manner within the vehicle track assembly combination.

It is an object of the present invention to satisfy the need expressed above. In accordance with the principles of the present invention, this objective is obtained by providing a vehicle seat track assembly which comprises the following four basic components. First, an elongated fixed track structure which is constructed to be fixed to a vehicle floor. Second, a cooperating movable track structure constructed to support a portion of a seat thereon. Third, a plurality of rolling elements are engaged between the track structures to rollingly support the movable track structure on the fixed track structure for fore and aft horizontal movements into a plurality of different positions of adjustment with respect to the fixed track structure. Fourth, a plurality of guide elements are engaged between the track structures to effectively prevent relative vertical movements therebetween in directions tending to vertically separate the track structures when in any position of adjustment and during the movement of the movable track structure with respect to the fixed track structure. In accordance with the principles of the present invention, the guide elements are mounted on one of the track structures and have generally vertically facing guide surfaces which have been formed by material removal to be positioned a predetermined distance vertically from generally opposed spaced surfaces on the one track structure. The vertically facing guide surfaces slidably engage generally oppositely facing surfaces of another of the track structures so as to effectively prevent relative vertical movement between the track structures in a direction tending to vertically separate the track structures.

Another object of the present invention is to provide an improved method of assembling a pair of track structures, a plurality of rolling elements and a plurality of plastic guide elements into a vehicle seat track assembly constructed and arranged to support a vehicle seat portion on a vehicle floor for fore and aft movements. In accordance with the principles of the present invention, the method comprises the steps of mounting the plastic guide elements in one track structure of the pair of track structures so as to present spaced generally vertically facing portions, removing plastic material from the vertically facing portions of the plastic guide elements to form a generally vertically facing spaced aligned surfaces which are spaced a predetermined vertical distance from a reference surface on the track structure, mounting one track structure with the plastic guide elements mounted therein in cooperating relation with another of the pair of track structures and the rolling elements so that (1) the rolling elements rollingly support a movable track structure of the pair of track structures on a fixed track structure of the pair of track structures and (2) spaced aligned vertically facing surfaces of the plastic guide elements slidably engage oppositely facing surfaces on the other track structure to thereby effectively prevent relative vertical movement between the pair of track members in a direction tending to vertically separate the pair of track structures.

The principles of the present invention enunciated above are applicable to all types of vehicle seat track assemblies but have particular applicability to vehicle seat track assemblies of the type capable of preventing vertical separation between the track structures even under an adverse seat belt load. Examples of seat track assemblies of this type are disclosed in the following patents in addition to the patent previously referred to: U.S. Pat. Nos. 4,487,459, 4,556,186, 4,863,289, and 4,950,088. French Patent Nos. 2,286,723 and 2,449,549, and European published patent application 0543317.

An important feature of vehicle seat track assemblies used with manually adjusted seats is the releasable locking mechanism which is integrated into the vehicle seat track assembly combination. Here again, cost effectiveness in the performance of the releasable locking mechanism within the vehicle seat track assembly combination is a highly desirable need.

Another object of the present invention is to fulfill the need expressed immediately above. In accordance with the principles of the present invention, this objective is obtained by providing a vehicle seat track assembly which comprises the following five basic components. First, an elongated fixed track structure constructed and arranged to be fixed to a vehicle floor. Second, a cooperating movable track structure supports a portion of a seat thereon. Third, a plurality of rolling elements are engaged between the track structures to rollingly support the movable track structure on the fixed track structure for fore and aft horizontal movements into a plurality of different positions of adjustment with respect to the fixed track structure. Fourth, a plurality of guide elements are engaged between the track structures to effectively prevent relative vertical movements therebetween in directions tending to vertically separate the track structures when in any position of adjustment and during the movement of the movable track structure with respect to the fixed track structure. The fifth component is the releasable locking mechanism itself. One of the track structures has a series of equally spaced vertically opening notches formed in a free end thereof. Another of the track structures has a plurality of vertically extending slots formed therein which are spaced apart so as to correspond with the spacing of the notches. The locking assembly is carried by the other track structure. In accordance with the principles of the present invention, the locking mechanism includes a pair of abutting metal plates stamped to provide abutting elongated mounting portions having a plurality of spaced abutting locking portions extending transversely therefrom through and beyond the spaced vertically extending slots. A mounting structure is connected with the mounting portions of the pair of abutting plates to move the locking portions of the abutting plates vertically within the slots. Finally, a resilient biasing structure is provided which serves to resiliently bias the mounting structure and abutting plates into a locking position wherein the locking portions are within selected notches and to enable the mounting structure and abutting plates to be moved against the resilient bias into a releasing position wherein the locking portions are out of the notches.

These and other objects of the present invention will become more apparent during the course of the following detailed description and appended claims.

The invention may best be understood with reference to the accompanying drawings wherein an illustrative embodiment is shown.

Figure 7:
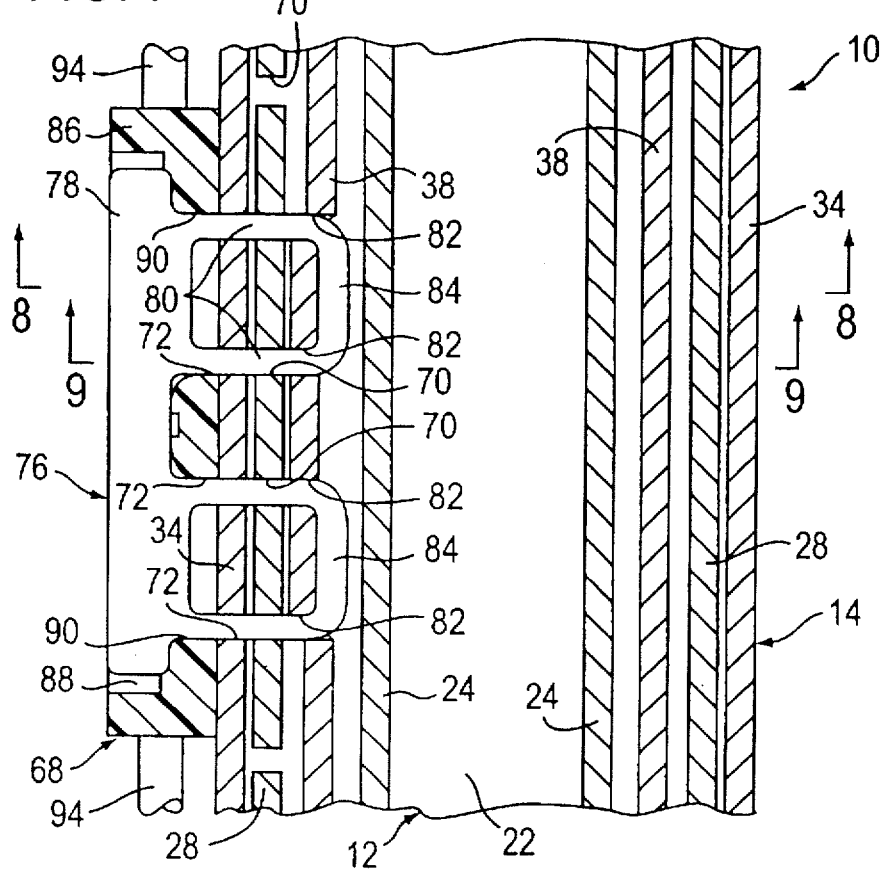
FIG. 7 is a fragmentary sectional view taken along the line 7—7 of FIG. 5.
Figure 8:
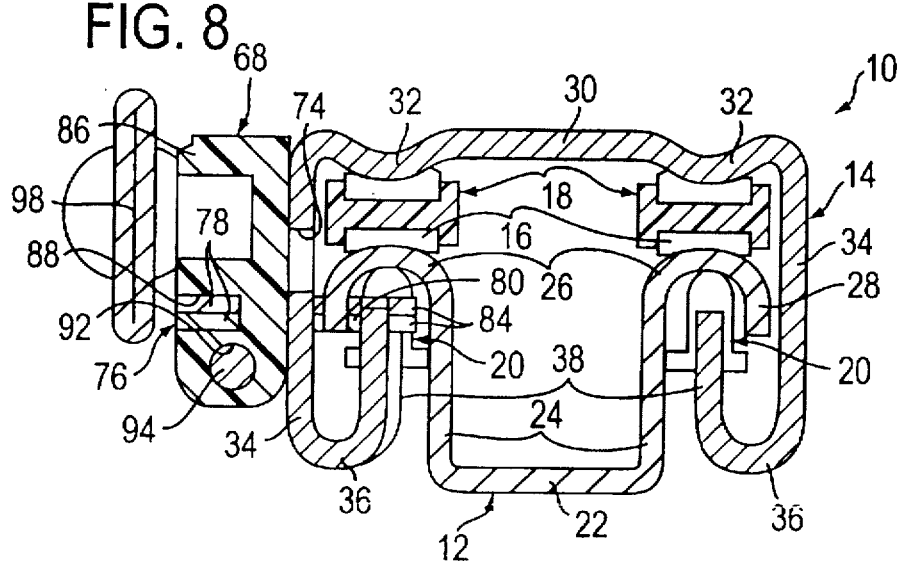
FIG. 8 is a sectional view taken along the line 8—8 of FIG. 7.

FIG. 9 a view similar to FIG. 8 taken along the line 9—9 of FIG. 7; and

FIG. 10 is a view similar to FIG. 9 showing the releasable locking assembly in its releasing position.

Figure 1:
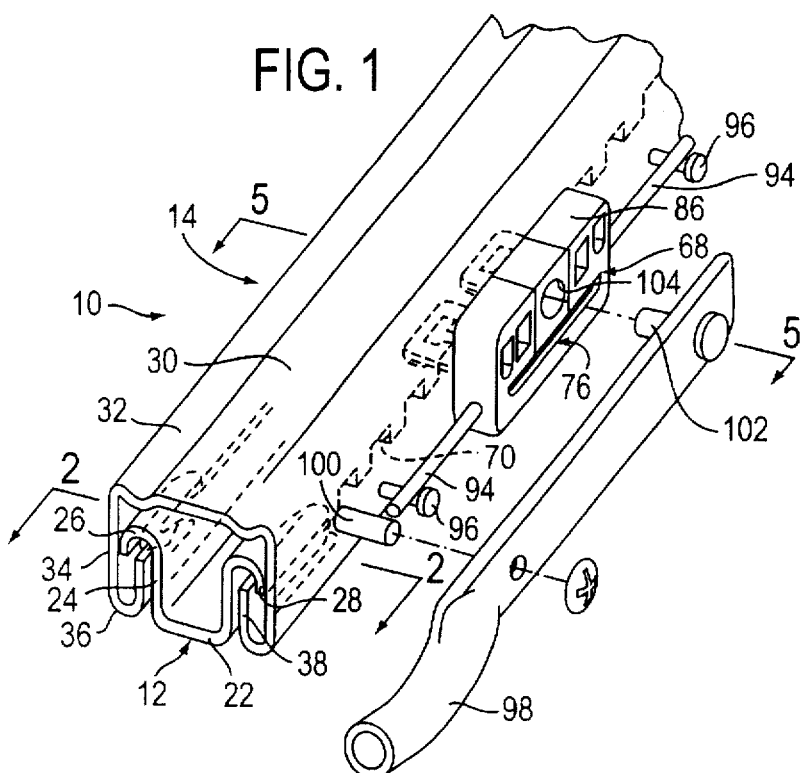
FIG. 1 is a fragmentary perspective view of a vehicle seat track assembly embodying the principles of the present invention showing the manual actuating lever for the releasable locking assembly in exploded view.

Referring now more particularly to the drawings, there is shown in FIG. 1 a vehicle seat track assembly, generally indicated at 10, which embodies the principles of the present invention. The track assembly 10 includes an elongated fixed track structure, generally indicated at 12, and a cooperating elongated movable track structure, generally indicated at 14. The basic track assembly 10 also includes a plurality of rolling elements 16 which are mounted in a pair of rolling assemblies, generally indicated at 18, and a plurality of guide elements, generally indicated at 20. The fixed track structure is preferably formed of sheet steel.

The fixed track structure 12 is preferably made of sheet steel bent to provide a fixed track member including an elongated lower central portion 22 having a pair of elongated upstanding leg portions 24 extending upwardly therefrom terminating in a pair of outwardly flared upwardly facing convex portions 26 having depending free end portions 28. The movable track structure 14 is likewise preferably made of sheet steel bent to provide a movable track member including an elongated upper central portion 30 having a pair of elongated transversely spaced downwardly facing convex depressions 32 formed integrally on opposite edges thereof and a pair of elongated depending leg portions 34 extending downwardly from opposite edges of the convex depressions terminating in a pair of downwardly facing convex portions 36 having upstanding free end portions 38.

The track members 12 and 14 are constructed and arranged to be telescopically interengaged in cooperating relation to one another so that the pair of upwardly facing convex portions 26 of the fixed track member 12 are disposed below the pair of downwardly facing convex depressions 32 and above the upstanding free end portions 38 of the movable track member 14. Preferably, the pair of upwardly facing convex portions 26 of the fixed track member 12 and the pair of downwardly facing convex depressions 32 of the movable track member 14 all provide convexly arcuate surfaces.

Each of the roller elements 16 comprises a roller having an annular groove of arcuate cross-sectional configuration formed in a central exterior periphery thereof providing arcuate annular surfaces operable to rollingly engage the convex arcuate surfaces of an associated downwardly facing convex depressions 32 and upwardly facing convex portions 26 respectively through a central angular extent thereof, as, for example, 30°. Preferably, each of the rollers 16 is made of steel.

Preferably, the rollers 16 at each side of the tracks are carried in a carrier structure, generally indicated at 40, forming a part of the rolling assemblies 18. As shown, each carrier is molded of a plastic material to include a pair of side walls 42 interconnected by a central web 44 which is suitably apertured to receive the rolling elements 16.

Figure 2:
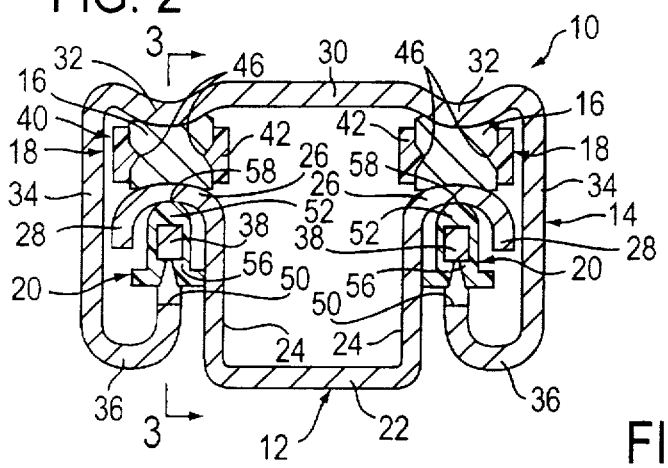
FIG. 2 is an enlarged sectional view taken along the line 2—2 of FIG. 1.

As best shown in FIG. 2, the side walls 42 at a position adjacent the apertures include oppositely facing knobular projections 46 which are adapted to engage within frustoconical recesses formed in the ends of each roller 16 to retain the roller 16 in the carrier structure 40.

It will be understood that, while the rolling assemblies of the type mentioned above are preferable, in the broadest aspects of the present invention any suitable rolling element may be utilized. As, for example, a cylindrical roller which engages between the central wall portions of the track members.

Figure 3:
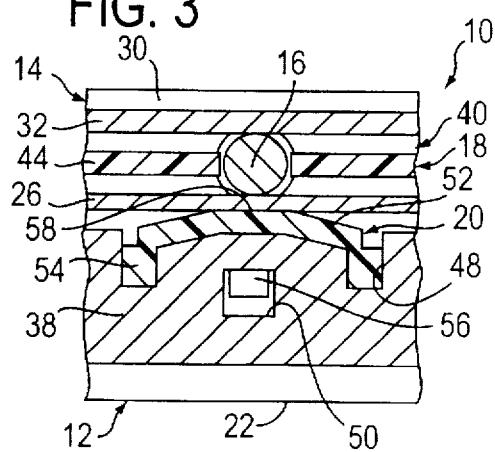
FIG. 3 is a fragmentary sectional view taken along the line 3—3 of FIG. 2.

Preferably, the movable track member 14 is initially roll-formed to provide the arcuate depressions 32. While in sheet form, the edges are cut out in the configuration shown in FIG. 3, which is generally an inverted U-shaped cut 48 on the edge and an opening 50 between the legs of the U. Preferably, there are eight cuts 48, four on each opposite edge, which, when the sheet metal is bent in a conventional bending machine, become the upstanding end portions 38.

The guide elements 20 are preferably in the form of molded plastic bodies which include a generally angularly shaped upper wall 52 having a peripheral wall 54 extending downwardly from the ends and sides thereof. The central portion of the sides of the peripheral wall 54 includes depending barb-like projections 56. Each guide element 20 is mounted in one of the cut-outs 48 by simply pressing the ends of the peripheral wall 54 into the associated cut-out 48 until the barb-like projections 54 snap into the associated central opening 50 to retain the guide element 20 in position. It can be seen that the interior surfaces of the upper wall 52 and peripheral wall 56 together with the barb-like projections 54 constitute connecting surfaces which snap fit into connecting relation and the engaged cooperating connecting surfaces of the track members 14. Once the guide element 20 has been mounted in the track member, the upper surfaces of the guide elements 20 are formed with an upwardly facing surface 58 by removing plastic material from each of the plastic bodies.

Figure 4:
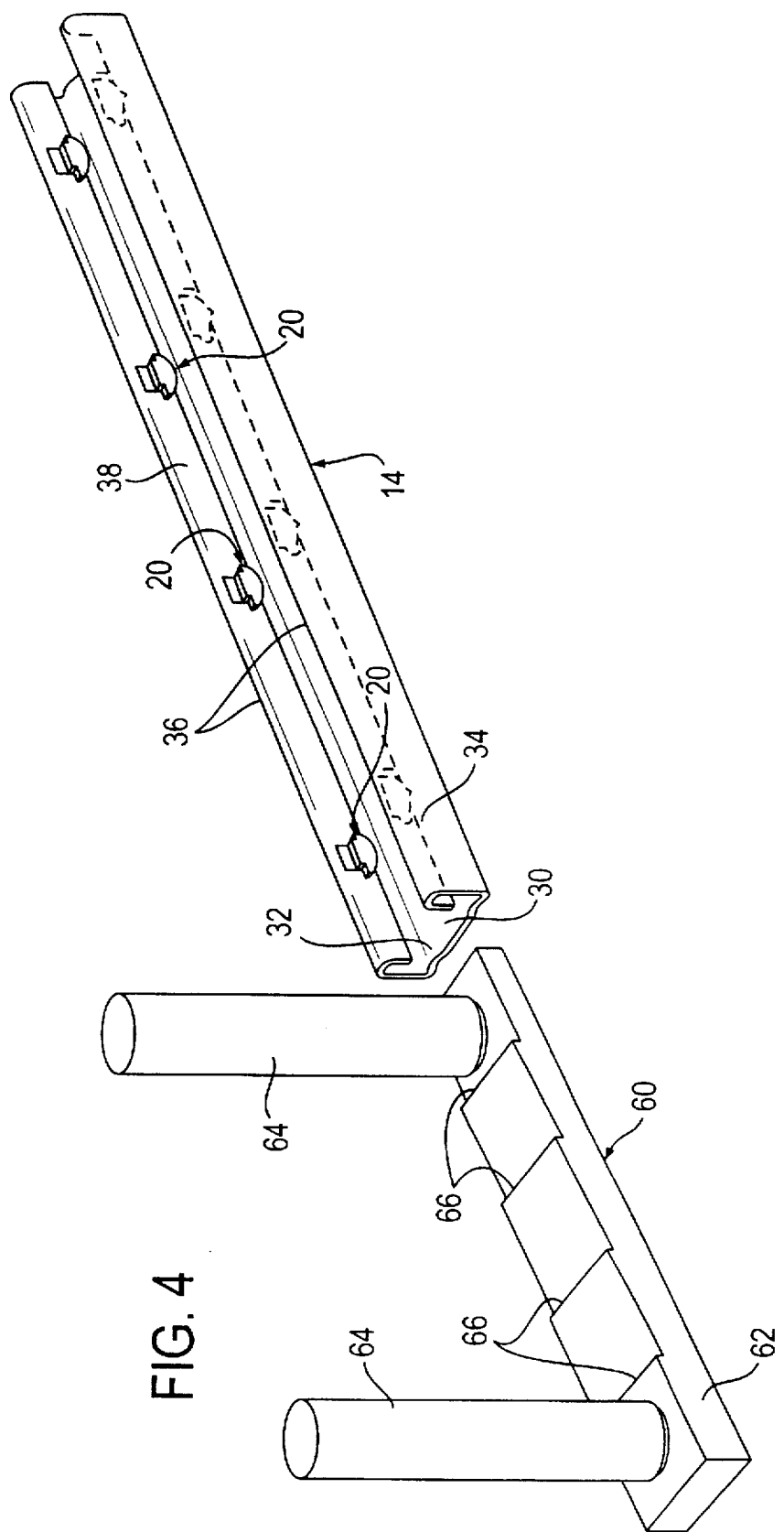
FIG. 4 is a somewhat schematic perspective view illustrating a procedure in the method of manufacturing the track assembly of the present invention.
Figure 5:
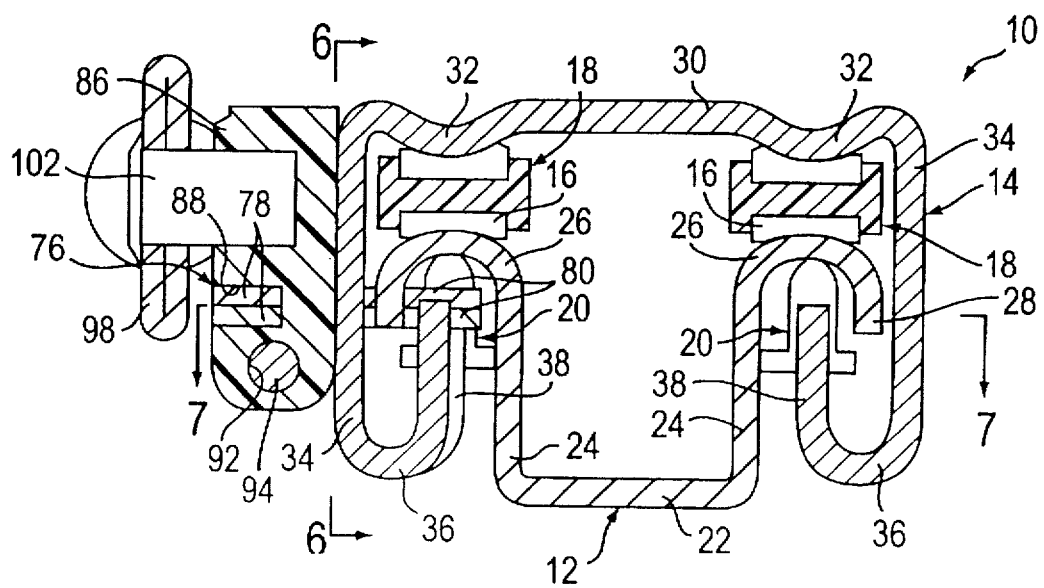
FIG. 5 is an enlarged sectional view taken along the line 5—5 of FIG. 1.

A preferred method and procedure for forming the surfaces 58 is schematically illustrated in FIG. 4. As shown therein, there is provided a broaching tool, generally indicated at 60, which includes a broaching blade 62 of elongated rectangular configuration having a width of a size to fit between the leg portions 34 of the track member 14. The blade 62 has pair of handles 64 extending upwardly from opposite ends thereof. The broaching blade 62 includes a series of stepped cutting edges 66 on the handle side thereof. The surface of the broaching tool opposite from the cutting edges 66 is adapted to engage the arcuate surfaces of the arcuate depressions 32 of the track member 14. When the broaching tool 62 is moved from one end of the track member 14 between the leg portions 34 thereof in engagement with the arcuate surfaces of the depressions 32 beyond the opposite end thereof, the cutting edges 66 of the broaching tool 60 serves to shave off incremental layers of plastic material from the upper walls 52 of the guide elements 20 so as to provide the finished surfaces 58 for all of the guide elements 20.

It will be understood that the upper wall 52 of the guide elements 20 normally has more material on the upper reaches thereof than would be needed so as to ensure that there will be material removed during the broaching operation. As soon as the broaching operation has been completed, it is then possible to assemble the rolling assemblies 18 and fixed track member 12 within the movable track member 14 to complete the basic track assembly 10.

Figure 6:
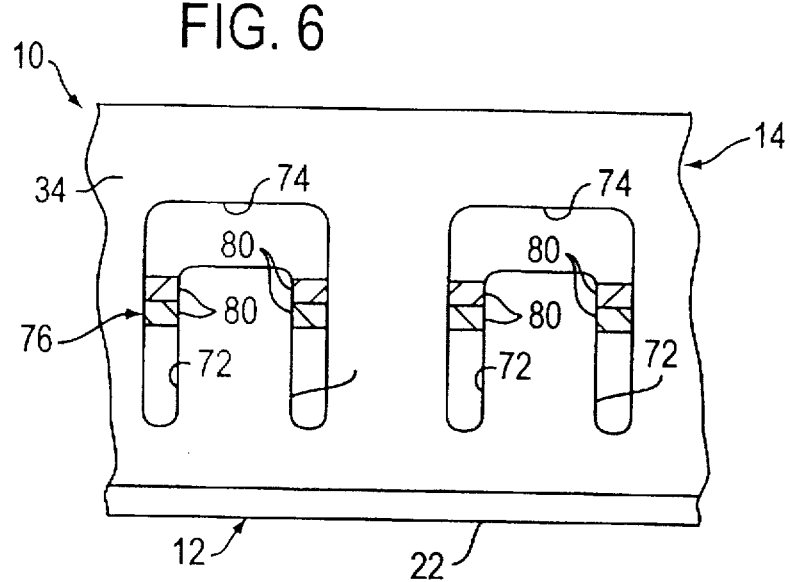
FIG. 6 is a fragmentary sectional view taken along the line 6—6 of FIG. 5.

As indicated above, the basic track assembly 10, as described above, can be utilized with a power-actuating mechanism, in which case the power-actuating mechanism serves as a means for retaining the two track members in any position of adjustment. When manual operation is contemplated, a releasable locking assembly may be utilized. Preferably, to accommodate a releasable locking assembly, generally indicated at 68, which embodies the principles of the present invention, one of the depending free end portions 28 of the fixed track member 12 is formed with a series of equally spaced downwardly opening notches 70. As best shown in FIG. 6, a corresponding one of the depending leg portions 34 of the movable track member 14 has a plurality of vertically extending parallel slots 72 formed therein which are spaced apart so as to correspond with the spacing of the notches 70. As best shown in FIG. 6, there are two pairs of slots 72 with each pair being interconnected at their upper ends with a wider cross slot 74.

The locking assembly 68 itself includes a pair of abutting metal plates, generally indicated at 76, stamped to provide abutting elongated mounting portions 78 having a plurality of spaced abutting notch-entering locking portions 80 extending transversely therefrom to extend through and beyond the spaced vertically extending slots 72 in the one depending leg portion 38. As best shown in FIG. 7, preferably, corresponding slots 82 are also formed in the corresponding upstanding end portion of the track member 14. The locking portions 80 are of sufficient length to extend through the slots 82 as well. As best shown in FIG. 7, the section of the corresponding end portion 38 within which the slots 82 are formed is bent closer to the associated leg portion 38. There are two pairs of locking portions 80 and the free ends of each pair of locking portions 80 are rigidly interconnected by abutting connecting portions 84 which extend along the interior surface of the upstanding end portions 38 between the slots 82.

The locking assembly 68 also includes a mounting structure 86 which is preferably in the form of a molded plastic body having a recess 88 formed in an outer face thereof which receives the abutting mounting portions 78 of the abutting plates 76 therein and a pair of spaced openings 90 extending from the recess to an opposite face thereof through which the abutting locking portions 80 of the abutting plates 76 extend. The mounting body 86 has a horizontally extending bore 92 formed below the recess 88. An elongated spring 94 extends through the bore 92 and has its central portion fixed therein with the free ends extending from the mounting body 86 at opposite ends thereof.

When the locking assembly 68 is utilized with the track assembly 10 in accordance with the principles of the present invention, the locking assembly 68 is mounted initially in cooperating relation with the movable track member 14 in the following manner. First, the locking assembly 68 itself is assembled by engaging the locking plates 76 within the recess 88 of the mounting body 86 and the spring 94 within the bore 92 of the mounting body 86. Next, the portion of the locking plates 76 which extend from the mounting body 86 are engaged within the horizontal slots 74 which extend through the leg portion 34 of the movable track member 14. Then, the locking assembly 68 is moved downwardly until the locking elements 80 engage the bottom of the slots 72 and 82, as shown in FIG. 10. The rolling assemblies 18 and fixed track member 12 can now be telescopically inserted in cooperating relation with the movable track member 14 with the locking assembly 68 in the lower position, as shown in FIG. 10, without there being any interference. Next, the locking assembly 68 is raised into its uppermost position, as shown in FIG. 9, with the locking portions 80 engaged within the notches 70. With the locking assembly 68 in this position, a pair of pins 96 are threadedly engaged within the threaded apertures in the leg portion 34 of the movable track member at positions abutting below the free ends of the spring 94. The interengagement of the pins 96 retains the locking assembly 68 in its locking position and still enables the mounting body 86 to be moved downwardly against the spring action into a lower releasing position, as shown in FIG. 10. A manual actuating member, such as U-shaped member 98, has its legs flattened and apertured intermediate the flattened ends thereof. The aperture in each flattened end rotatably receives a shaft 100 fixed as by a threaded engagement to the leg portion 34 of the movable track member 14. The rearward end of the flattened portion of each leg includes a pin 102 which extends laterally therefrom and is engaged within a horizontally elongated opening 104 formed in the central exterior portion of the mounting body 86 at a position above the locking plates as shown in FIG. 8.

It will be understood that the provision of two plates provides a highly desirable locking characteristic in that there is always a single plate having locking portions engaged in the uppermost portions of the notches 70 which will have a different engagement than the locking portions of the other plate. This arrangement provides a greater locking capacity prior to failure than would be the case otherwise. While a single locking assembly 68 for each track assembly 10 is preferable, it will be understood that it is within the contemplation of the present invention to duplicate the locking assembly 68 on the opposite side of the track assembly 10 if greater locking capability is required or to provide bridging arrangements as disclosed in the aforesaid European Patent Publication 543,317.

Any United States patent applications or patents mentioned or cited hereinabove are hereby incorporated by reference into the present specification.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A vehicle seat track assembly comprising an elongated fixed track structure constructed and arranged to be fixed to a vehicle floor, a cooperating movable track structure constructed and arranged to support a portion of a seat thereon, a plurality of rolling elements engaged between said track structures constructed and arranged to rollingly support said movable track structure on said fixed track structure for fore and aft horizontal movements into a plurality of different positions of adjustment with respect to said fixed track structure, a plurality of guide elements molded from a plastic material engaged between said track structures constructed and arranged to effectively prevent relative vertical movements between said track structures in directions tending to vertically separate said track structures when in any position of adjustment and during the movement of said movable track structure with respect to said fixed track structure, said guide elements being mounted on one of said track structures and having molded plastic surfaces through a portion of an exterior extent thereof and having generally vertically facing guide surfaces through another portion of the exterior extent thereof formed by material removal of said plastic material while said guide elements are in connected relation with said one track structure, said guide surfaces being positioned a common predetermined distance vertically from generally opposed spaced surfaces on said one track structure irrespective of tolerance variations between said individual guide elements and said one track structure, said vertically facing guide surfaces slidably engaging generally oppositely facing surfaces of another of said track structures so as to effectively prevent relative vertical movement between said track structures in a direction tending to vertically separate said track structures;

said guide elements including connecting surfaces constructed and arranged to snap fit into connected relation with cooperating surfaces formed in one of said track structures, said guide elements each including respective angular upper walls extending upwardly towards said vertically facing guide surfaces formed by material removal, said guide elements each further including respective peripheral walls extending downwardly from ends and sides of associated ones of said upper walls, said peripheral walls each having barb-like depending portions at opposite sides thereof and constructed and arranged to snap fit into an associated opening in said one track structure.

2. A vehicle seat track assembly as defined in claim 1 wherein said vertically facing surfaces of said guide elements are formed by a broaching tool while in connected relation with said one track structure.

3. A vehicle seat track assembly as defined in claim 1 wherein said fixed track structure comprises a fixed track member including an elongated lower central portion having a pair of elongated upstanding leg portions extending upwardly therefrom terminating in a pair of upwardly facing convex portions having depending free end portions, and said movable track structure comprises a movable track member including an elongated upper central portion having a pair of elongated transversely spaced downwardly facing convex depressions formed therein and a pair of elongated depending leg portions extending downwardly therefrom terminating in a pair of downwardly facing convex portions having upstanding free end portions, said track members being constructed and arranged in cooperating relation to one another so that the pair of upwardly facing convex portions of said fixed track member are disposed below the pair of downwardly facing convex depressions and above the upstanding free end portions of said movable track member.

4. A vehicle seat track assembly as defined in claim 3 wherein the pair of upwardly facing convex portions of said fixed track member and the pair of downwardly facing convex depressions of said movable track member having convexly arcuate surfaces.

5. A vehicle seat track assembly as defined in claim 4 wherein each of said rolling elements comprises a roller having an annular groove of arcuate cross-sectional configuration formed in a central exterior periphery thereof providing arcuate annular surfaces operable to rollingly engage the convex arcuate surfaces of an associated downwardly facing convex depression and upwardly facing convex portion respectively along an arcuate extent.

6. A vehicle seat track assembly as defined in claim 5 wherein said rollers are carried within a pair of carrier structures, each including side walls connected by a central web having a series of spaced apertures formed therein, said side walls including opposed projections in each aperture engageable within recesses formed in opposite ends of each roller to retain the same in the aperture.

7. A vehicle seat track assembly comprising an elongated fixed track structure constructed and arranged to be fixed to a vehicle floor, a cooperating movable track structure constructed and arranged to support a portion of a seat thereon, a plurality of rolling elements engaged between said track structures constructed and arranged to rollingly support said movable track structure on said fixed track structure for fore and aft horizontal movements into a plurality of different positions of adjustment with respect to said fixed track structure, a plurality of guide elements engaged between said track structures constructed and arranged to effectively prevent relative vertical movements therebetween in directions tending to vertically separate said track structures when in any position of adjustment and during the movement of said movable track structure with respect to said fixed track structure.

one of said track structures having a series of equally spaced vertically opening notches formed in a free end thereof, another of said track structures having a plurality of vertically extending slots formed therein which are spaced apart so as to correspond with the spacing of said notches, and a locking assembly carried by the other track structure including a pair of abutting metal plates stamped to provide abutting elongated mounting portions having a plurality of spaced abutting locking portions extending transversely therefrom through and beyond said spaced vertically extending slots, a mounting structure connected with the mounting portions of said pair of abutting plates constructed and arranged to move the locking portions of said abutting plates vertically within said slots and a resilient biasing structure constructed and arranged to resiliently bias said mounting structure and abutting plates into a locking position wherein said locking portions are within selected notches and to enable said mounting structure and abutting plates to be moved against the resilient bias into a releasing position wherein said locking portions are out of said notches.

8. A vehicle seat track assembly as defined in claim 7 wherein said mounting structure includes a mounting body having a recess formed in a face thereof receiving the mounting portions of said abutting plates therein and a pair of spaced openings extending from said recess to an opposite face thereof through which the locking portions of said abutting plates extend, said resilient biasing structure including an elongated spring having a central portion connected to said mounting body and free ends extending from opposite ends of said body engaged with said other track structure.

9. A vehicle seat track assembly as defined in claim 8 wherein said plurality of spaced abutting locking portions includes two pairs of spaced abutting locking portions, each pair of spaced abutting locking portions having free ends with abutting connecting portions extending therebetween.

10. A vehicle seat track assembly as defined in claim 9 wherein said guide elements are mounted on one of said track structures and have generally vertically facing guide surfaces which have been formed by material removal to be positioned a predetermined distance vertically from generally opposed spaced surfaces on said one track structure, said vertically facing guide surfaces slidably engaging generally oppositely facing surfaces of another of said track structures so as to effectively prevent relative vertical movement between said track structures in a direction tending to vertically separate said track structures.

11. A vehicle seat track assembly as defined in claim 10 wherein each of said guide elements is molded of plastic material and includes connecting surfaces constructed and arranged to snap fit into connected relation with cooperating connecting surfaces formed in one of said track structures.

12. A vehicle seat track assembly as defined in claim 11 wherein each guide element includes an angular upper wall and a peripheral wall extending downwardly from ends and sides of said upper wall, said peripheral wall at opposite sides thereof having barb-like depending portions constructed and arranged to snap fit into an opening in said one track structure.

13. A vehicle seat track assembly as defined in claim 10 wherein said vertically facing surfaces of said guide elements are formed by a broaching tool while in connected relation with said one track structure.

14. A vehicle seat track assembly as defined in claim 8 wherein said fixed track structure comprises a fixed track member including an elongated lower central portion having a pair of elongated upstanding leg portions extending upwardly therefrom terminating in a pair of upwardly facing convex portions having depending free end portions, and said movable track structure comprises a movable track member including an elongated upper central portion having a pair of elongated transversely spaced downwardly facing convex depressions formed therein and a pair of elongated depending leg portions extending downwardly therefrom terminating in a pair of downwardly facing convex portions having upstanding free end portions, said track members being constructed and arranged in cooperating relation to one another so that the pair of upwardly facing convex portions of said fixed track member are disposed below the pair of downwardly facing convex depressions and above the upstanding free end portions of said movable track member.

15. A vehicle seat track assembly as defined in claim 14 wherein the pair of upwardly facing convex portions of said fixed track member and the pair of downwardly facing convex depressions of said movable track member all provide convexly arcuate surfaces.

16. A vehicle seat track assembly as defined in claim 15 wherein each of said rolling elements comprises a roller having an annular groove of arcuate cross-sectional configuration formed in a central exterior periphery thereof providing arcuate annular surfaces operable to rollingly engage the convex arcuate surfaces of an associated downwardly facing convex depression and upwardly facing convex portion respectively along an arcuate extent.

17. A vehicle seat track assembly as defined in claim 16 wherein said rollers are carried within a pair of carrier structures, each including side walls connected by a central web having a series of spaced apertures formed therein, said side walls including opposed projections in each aperture engageable within recesses formed in opposite ends of each roller to retain the same in the aperture.

18. A vehicle seat track assembly comprising an elongated fixed track member constructed and arranged to be fixed to a vehicle floor and a cooperating movable track member constructed and arranged to support a portion of a seat thereon, said fixed track member including an elongated lower central portion having a pair of elongated upstanding leg portions extending upwardly therefrom terminating in a pair of upwardly facing convex portions having depending free end portions, said movable track member including an elongated upper central portion having a pair of elongated transversely spaced downwardly facing convex depressions formed therein and a pair of elongated depending leg portions extending downwardly therefrom terminating in a pair of downwardly facing convex portions having upstanding free end portions, said track members being constructed and arranged in cooperating relation to one another so that the pair of upwardly facing convex portions of said fixed track member are disposed below the pair of downwardly facing convex depressions and above the upstanding free end portions of said movable track member, a plurality of rolling elements engaged between said pair of upwardly facing convex portions and said pair of downwardly facing convex depressions to rollingly support said movable track member on said fixed track member, a plurality of guide elements mounted on the upstanding free end portions of said movable track member, said guide elements having upwardly facing guide surfaces which have been formed by material removal to be positioned a predetermined distance downwardly from said downwardly facing convex depressions, said upwardly facing guide surfaces slidably engaging downwardly facing surfaces of said upwardly facing convex portions of said fixed track member so as to effectively prevent relative vertical movements between said track members in a direction tending to vertically separate said track members, one of the depending free end portions of said fixed track member having a series of equally spaced downwardly opening notches formed therein, a corresponding one of the depending leg portions of said movable track member having a plurality of vertically extending slots formed therein which are spaced apart so as to correspond with the spacing of said notches, a locking assembly including a plurality of spaced notch entering locking portions extending transversely through and beyond the spaced vertically extending slots in said one depending leg portion, said locking assembly being constructed and arranged to resiliently bias the notch entering locking portions into a locking position within an upper extent of said slots and within selected notches and to enable the notch entering locking portions to be moved downwardly into a releasing position within a lower extent of said slots and out of said notches.

19. A vehicle seat track assembly as defined in claim 18 wherein each of said guide elements is molded of plastic material and includes connecting surfaces constructed and arranged to snap fit into connected relation with cooperating connecting surfaces formed in one of said track structures.

20. A vehicle seat track assembly as defined in claim 19 wherein each guide element includes an angular upper wall and a peripheral wall extending downwardly from ends and sides of said upper wall, said peripheral wall at opposite sides thereof having barb-like depending portions constructed and arranged to snap fit into an opening in said one track structure.

21. A vehicle seat track assembly as defined in claim 17 wherein said vertically facing surfaces of said guide elements are formed simultaneously by a broaching tool while in connected relation with said one track structure.

22. A vehicle seat track assembly comprising an elongated fixed track member constructed and arranged to be fixed to a vehicle floor and a cooperating movable track member constructed and arranged to support a portion of a seat thereon, said fixed track member including an elongated lower central portion having a pair of elongated upstanding leg portions extending upwardly therefrom terminating in a pair of upwardly facing convex portions having depending free end portions, said movable track member including an elongated upper central portion having a pair of elongated transversely spaced downwardly facing convex depressions formed therein and a pair of elongated depending leg portions extending downwardly therefrom terminating in a pair of downwardly facing convex portions having upstanding free end portions, said track members being constructed and arranged in cooperating relation to one another so that the pair of upwardly facing convex portions of said fixed track member are disposed below the pair of downwardly facing convex depressions and above the upstanding free end portions of said movable track member, a plurality of rolling elements engaged between said pair of upwardly facing convex portions and said pair of downwardly facing convex depressions to rollingly support said movable track member on said fixed track member, a plurality of guide elements mounted on the upstanding free end portions of said movable track member, said guide elements having upwardly facing guide surfaces slidably engaging downwardly facing surfaces of said upwardly facing convex portions of said fixed track member so as to effectively prevent relative vertical movements between said track members in directions tending to vertically separate said track members, one of the depending free end portions of said fixed track member having a series of equally spaced downwardly opening notches formed therein, a corresponding one of the depending leg portions of said movable track member having a plurality of vertically extending slots formed therein which are spaced apart so as to correspond with the spacing of said notches, and a locking assembly including a pair of abutting metal plates stamped to provide abutting elongated mounting portions having a plurality of spaced abutting notch entering locking portions extending transversely therefrom through and beyond the spaced vertically extending slots in said one depending leg portion, said locking assembly being constructed and arranged to resiliently bias the notch entering locking portions of said abutting plates into a locking position within an upper extent of said slots and within selected notches and to enable the notch entering locking portions of said abutting plates to be moved downwardly into a releasing position within a lower extent of said slots and out of said notches.

23. A vehicle seat track assembly as defined in claim 22 wherein said mounting structure includes a mounting body having a recess formed in a face thereof receiving the mounting portions of said abutting plates therein and a pair of spaced openings extending from said recess to an opposite face thereof through which the locking portions of said abutting plates extend, said resilient biasing structure including an elongated spring having a central portion connected to said mounting body and free ends extending from opposite ends of said body engaged with said other track structure.

24. A vehicle seat track assembly as defined in claim 23 wherein said plurality of spaced abutting locking portions includes two pairs of spaced abutting locking portions, each pair of spaced abutting locking portions having free ends with abutting connecting portions extending therebetween.

25. A method of assembling a pair of track structures, a plurality of plastic guide elements, a plurality of rolling elements into a vehicle seat track assembly constructed and arranged to support a vehicle seat portion on a vehicle floor for fore and aft movement, said method comprising mounting said plastic guide elements in one track structure of said pair of track structures so as to present spaced generally vertically facing portions, removing plastic material from said vertically facing portions of said plastic guide elements to form a generally vertically facing spaced aligned surfaces which are spaced a predetermined vertical distance from a reference surface on said one track structure, subsequent to said removing, mounting said one track structure with said plastic guide elements mounted therein in cooperating relation with another of said pair of track structures and said rolling elements so that (1) said rolling elements rollingly support a movable track structure of said pair of track structures on a fixed track structure of said pair of track structures and (2) said spaced aligned vertically facing surfaces of said plastic guide elements slidably engage oppositely facing surfaces on the other track structure to thereby effectively prevent relative vertical movement between said pair of track members in a direction tending to vertically separate said pair of track structures.

26. A method as defined in claim 25 wherein said plastic material is removed by broaching with a broaching tool engaging said reference surfaces.

* * * * *